(12) United States Patent
Karino et al.

(10) Patent No.: US 12,305,765 B2
(45) Date of Patent: May 20, 2025

(54) FLUID VALVE

(71) Applicant: Nabtesco Corporation, Tokyo (JP)

(72) Inventors: Takuhiro Karino, Tokyo (JP); Yuji Aoki, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 5 days.

(21) Appl. No.: 18/468,080

(22) Filed: Sep. 15, 2023

(65) Prior Publication Data

US 2024/0142005 A1     May 2, 2024

(30) Foreign Application Priority Data

Oct. 27, 2022    (JP) ................................ 2022-172167

(51) Int. Cl.
    *F16K 11/07*          (2006.01)

(52) U.S. Cl.
    CPC ...... *F16K 11/0708* (2013.01); *F16K 11/0716* (2013.01)

(58) Field of Classification Search
    CPC .............. F16K 11/0708; F16K 11/0716; F15B 13/0402
    See application file for complete search history.

(56) References Cited

U.S. PATENT DOCUMENTS

| | | |
|---|---|---|
| 2018/0299019 A1 | 10/2018 | Wojick et al. |
| 2020/0408115 A1* | 12/2020 | Mitsutani ............. F01L 1/3442 |
| 2021/0388857 A1* | 12/2021 | Mlinaric ................ F01L 1/047 |

FOREIGN PATENT DOCUMENTS

| | | |
|---|---|---|
| JP | 6-81815 A | 3/1994 |
| JP | 9-296807 A | 11/1997 |

OTHER PUBLICATIONS

Extended European Search Report dated Feb. 12, 2024, issued in corresponding European Patent Application No. 23197310.8 (9 pgs.).

* cited by examiner

*Primary Examiner* — Kelsey E Cary
(74) *Attorney, Agent, or Firm* — Pillsbury Winthrop Shaw Pittman, LLP

(57) ABSTRACT

A timer valve 1 relating to an aspect of the present disclosure includes: a housing 2 including a spool hole 5 being in communication with a drain port 9, a feeding port 6 configured to receive hydraulic oil fed thereto and a discharge port 7 configured to discharge the hydraulic oil; and a spool 3 movably provided in the spool hole 5. The spool 3 has a first connection recess 15 defined in an outer surface 3*a*, the first connection recess 15 being configured to establish communication between the feeding port 6 and the discharge port 7; and a liaison channel 30 establishing communication between the first connection recess 15 and the drain port 9. Within the liaison channel 30, a filter 25 is formed between the spool hole 5 and the outer surface 3*a* of the spool 3 to stop foreign matter from entering into the drain port 9.

8 Claims, 8 Drawing Sheets

First Direction ←——→ Second Direction

FLUID VALVE

CROSS-REFERENCE TO RELATED APPLICATIONS

This application is based on and claims the benefit of priority from Japanese Patent Application Serial No. 2022-172167 (filed on Oct. 27, 2022), the contents of which are hereby incorporated by reference in their entirety.

TECHNICAL FIELD

The present disclosure relates to a fluid valve.

BACKGROUND

Fluid valves include hydraulic valves (control valves), which are used in hydraulic excavators and other construction machines. A construction machine includes a hydraulic actuator for driving an arm and a circling structure, a hydraulic pump for feeding hydraulic oil to the hydraulic actuator, and a hydraulic circuit connecting the hydraulic actuator and the hydraulic pump. The hydraulic actuator is, for example, a hydraulic cylinder or motor. The hydraulic circuit is constituted by a plurality of hydraulic valves.

The hydraulic valves control the flow of the hydraulic oil fed to the hydraulic actuator. Specifically, the flow of the hydraulic oil fed to the hydraulic actuator is controlled by driving the spools provided in the hydraulic valves. The hydraulic circuit includes a filter for preventing foreign objects from entering the hydraulic actuator and valves. The hydraulic oil is fed to the hydraulic actuator and valves after filtered through the filter (see, for example, Japanese Patent Application Publication No. Hei 6-81815)

The above-described conventional technology requires an independent filter to filter the hydraulic oil. As a result, the hydraulic circuit as a whole has an increased number of parts, which complicates the production management.

SUMMARY

The present disclosure provides a fluid valve that allows a reduced number of parts, thereby facilitating the production management.

An aspect of the present disclosure provides a fluid valve including: a housing having a spool hole, a feeding port and a discharge port, the spool hole being in communication with a drain port, the feeding port being configured to receive a hydraulic fluid fed thereto, and the discharge port being configured to discharge the hydraulic fluid; and a spool movably provided in the spool hole. The spool has: a connection recess defined in an outer surface of the spool, the connection recess being configured to establish communication between the feeding port and the discharge port; and a liaison channel establishing communication between the connection recess and the drain port. Within the liaison channel, a filter is formed between the spool hole and the outer surface of the spool to stop foreign matter from entering into the drain port.

The implementation eliminates the need for a separate filter. No filters are used. The fluid valve thus allows a reduced number of parts, thereby facilitating the production management.

In the implementation, the filter may have a minute gap formed between the spool hole and the outer surface of the spool, and a radial width of the minute gap may be sized to inhibit passage of foreign matter of a desired size.

In the implementation, the minute gap may constitute a given part of a gap formed between the spool hole and the outer surface of the spool, and the minute gap may have a greater radial width than a remaining part of the gap formed between the spool hole and the outer surface of the spool since a corresponding part of the spool hole has a large inner diameter or a corresponding part of the outer surface of the spool has a small outer diameter.

In the implementation, at least one of an inner surface of the spool hole or the outer surface of the spool between which the minute gap is formed may be inclined with respect to an axial direction such that the radial width of the minute gap progressively decreases toward the drain port.

In the implementation, the liaison channel may have: a fluid inlet chamber extending along a central axis of the spool, the fluid inlet chamber being in communication with the connection recess; and a discharge recess defined in the outer surface of the spool, the discharge recess being positioned closer to the drain port than is the connection recess, the discharge recess being in communication with the fluid inlet chamber. The filter may extend between the discharge recess and an end of the spool facing the drain port.

In the implementation, the liaison channel may have: a discharge chamber extending along an axis of the spool, the discharge chamber being formed at the end of the spool facing the drain port; and an inlet recess defined in the outer surface of the spool, the inlet recess being positioned closer to the drain port than is the discharge recess, the inlet recess being in communication with the discharge chamber. The filter may extend between the discharge recess and the inlet recess.

In the implementation, the fluid valve may include a throttle provided in the discharge chamber, the throttle being configured to regulate an amount of hydraulic fluid discharged from the discharge chamber to the drain port.

In the implementation, the fluid valve may include an elastic member provided in the spool hole and lying between the drain port and the spool, the elastic member being configured to force the spool away from the drain port. The spool may have another connection recess defined in the outer surface, the other connection recess being positioned on an opposite side to the drain port with respect to the connection recess, and the other connection recess may be disconnected from the fluid inlet chamber.

Another aspect of the present disclosure provides a fluid valve including a housing having a spool hole, a feeding port and a discharge port, the spool hole being in communication with a drain port, the feeding port being configured to receive a hydraulic fluid fed thereto, and the discharge port being configured to discharge the hydraulic fluid; a spool movably provided in the spool hole; and an elastic member provided in the spool hole and lying between the drain port and the spool, the elastic member being configured to force the spool away from the drain port. The spool has: a connection recess defined in an outer surface of the spool, the connection recess being configured to establish communication between the feeding port and the discharge port; another connection recess defined in the outer surface of the spool, the other connection recess being positioned on an opposite side to the drain port with respect to the connection recess, the other connection recess being configured to establish communication between the feeding port and the discharge port; a fluid inlet chamber extending along a central axis of the spool, the fluid inlet chamber being in communication with the connection recess; and a discharge recess defined in the outer surface of the spool, the discharge recess being positioned closer to the drain port than is the connection recess, the discharge recess being in communication with the fluid inlet chamber. A filter extends between the discharge recess and an end of the spool facing the drain port to stop foreign matter from entering into the drain port, the filter has a minute gap formed between the spool hole and the outer surface of the spool, and a radial width of the minute gap is sized to inhibit passage of foreign matter of a desired size.

The fluid valve can be used as a timer valve in, for example, a construction machine. The timer valve is used in a brake device provided in a hydraulic actuator, which generates high inertia load. The timer valve no longer needs filters. Since the timer valve allows a reduced number of parts, the production management can be facilitated.

Advantageous Effects

The fluid valves described above allow a reduced number of parts, thereby facilitating the production management.

DESCRIPTION OF THE PREFERRED EMBODIMENTS

The embodiments of the present disclosure will be hereinafter described with reference to the drawings.

Timer Valve

Figure 1:
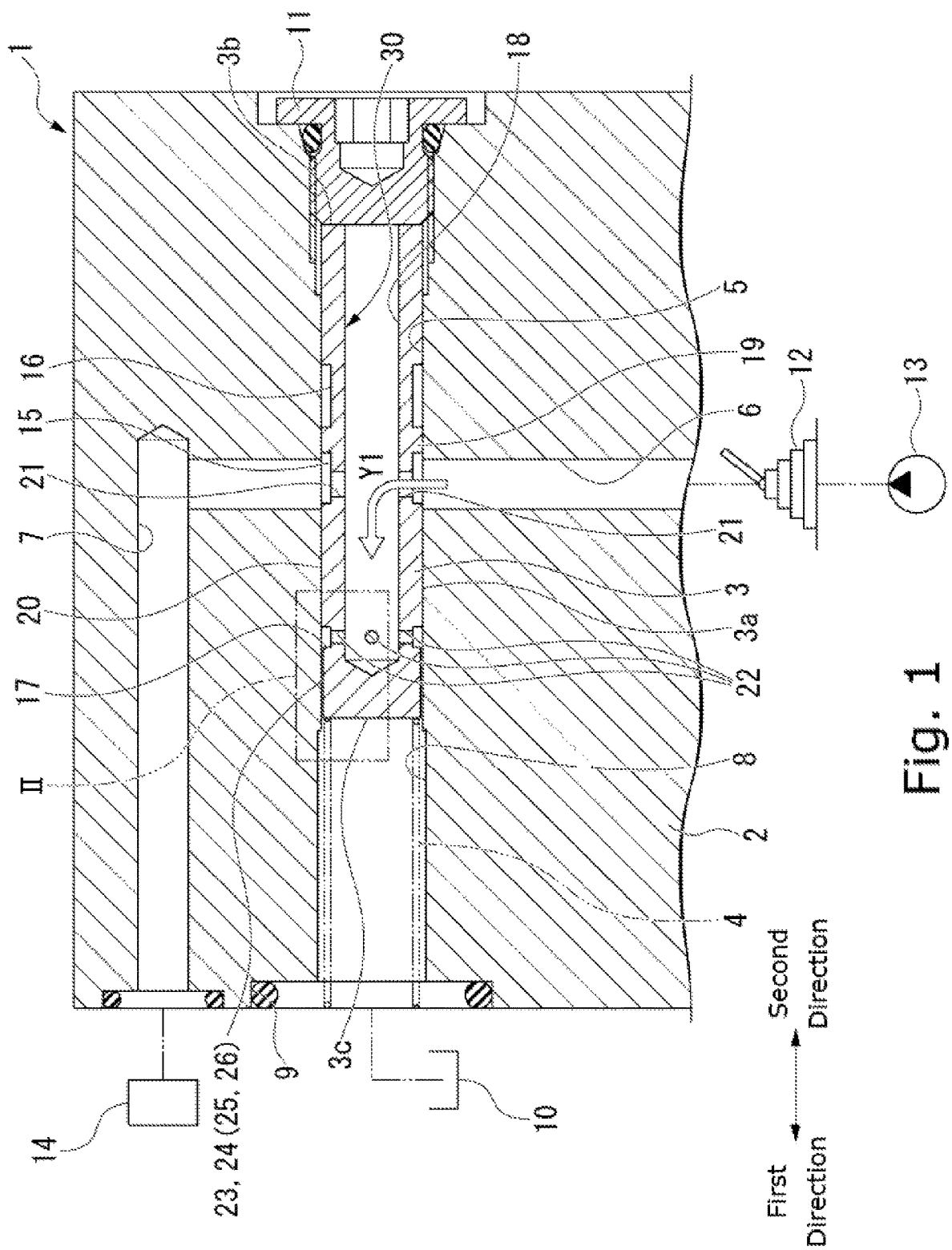
FIG. 1 schematically shows the configuration of a timer valve relating to an embodiment of the present disclosure.

FIG. 1 schematically shows the configuration of a timer valve 1. In the subsequent drawings, the scale is appropriately changed for the sake of better understanding. The timer valve 1 is used in a construction machine such as a hydraulic excavator, which is not shown. The timer valve 1 may control a mechanical brake 14, which can be provided in the construction machine, such that the mechanical brake 14 may operate (apply a braking force) at a point of time later than when an operator manipulates the mechanical brake 14.

The mechanical brake 14 applies a braking force to a hydraulic actuator such as a hydraulic motor installed on the construction machine. Although not shown in the drawings, the hydraulic actuator is designed to enable the construction machine to travel or to rotate a circling structure. The mechanical brake 14 generates the braking force, for example, by using a constant spring force. The mechanical brake 14 stops applying the braking force in response to hydraulic oil fed to the mechanical brake 14. The timer valve 1 can keep the hydraulic actuator in operation for a while due to a large inertia force after the flow of the hydraulic oil to the hydraulic actuator is stopped.

As shown in FIG. 1, the timer valve 1 includes a housing 2, a spool 3 provided in the housing 2, and a coil spring 4. The housing 2 has a spool hole 5, a feeding port 6, and a discharge port 7. The spool 3 and coil spring 4 are housed in the spool hole 5, the hydraulic oil (hydraulic fluid) is fed through the feeding port 6 and discharged through the discharge port 7.

In the housing 2, a drain chamber 8 is continuous from the spool hole 5 and formed next to the spool hole 5 in a first direction (the left side in FIG. 1). The drain chamber 8 and spool hole 5 are coaxially arranged. The drain chamber 8 has a slightly greater inner diameter than the spool hole 5 via a step 8a (see FIG. 2). A drain port 9 is formed at an end of the drain chamber 8 facing the first direction. The drain chamber 8 is connected to a tank 10 through the drain port 9. The spool hole 5 is closed by a plug 11 at its end facing a second direction (the right side in FIG. 1), which is oppositely directed to the first direction (at the end opposite to the end where the drain port 9 is formed).

The feeding port 6 is formed such that its axial direction is orthogonal to the axial direction of the spool hole 5. The feeding port 6 is continuous from the spool hole 5. The feeding port 6 is connected to an operating unit 12, which is operated by the operator of the construction machine. The operating unit 12 is connected to a hydraulic pump 13. The hydraulic pump 13 is used to generate a pressure (pilot pressure) to be applied to the hydraulic oil through the operating unit 12, for example. The pressure resulting from the operation through the operating unit 12 acts upon the hydraulic oil fed through the feeding port 6.

The discharge port 7 is formed on the opposite side of the feeding port 6 with the spool hole 5 being sandwiched therebetween. The discharge port 7 is continuous from the spool hole 5. The part of the discharge port 7 that is near the spool hole 5 is coaxially arranged with the feeding port 6. The part of the discharge port 7 that is distant from the spool hole 5 is connected to the mechanical brake 14 provided in the construction machine.

The spool 3 is slidably housed in the spool hole 5. The outer diameter of the spool 3 is slightly smaller than the inner diameter of the spool hole 5. Two connection recesses 15 and 16 (a first connection recess 15 and a second connection recess 16) are formed on the outer surface 3a of the spool 3. The first connection recess 15 of the two connection recesses 15 and 16 is mentioned as an example of a connection recess recited in the claims. The second connection recess 16 of the two connection recesses 15 and 16 is mentioned as an example of another connection recess recited in the claims. The connection recesses 15 and 16 are annularly formed along the entire outer surface 3a of the spool 3.

Of the two connection recesses 15 and 16, the first connection recess 15 is located at the center in the axial direction of the spool 3. Of the two connection recesses 15 and 16, the second connection recess 16 is located on the second direction side with respect to the first connection recess 15 (on the opposite side to the drain port 9 and drain chamber 8). A first land 19 is defined between the two connection recesses 15 and 16.

The spool 3 has a liaison channel 30 formed therein for establishing communication between the first connection recess 15 and the drain port 9 (drain chamber 8). The liaison channel 30 mainly includes a hydraulic oil inlet chamber 18 extending along the central axis of the spool 3, and a discharge recess 17 and a channel 23 formed in the outer surface 3a of the spool 3. The hydraulic oil inlet chamber 18 originates at an end 3b of the spool 3 facing the second direction and terminates at a site slightly off, toward the first direction, the site where the discharge recess 17 is formed. In other words, the hydraulic oil inlet chamber 18 is open at the end 3b of the spool 3 facing the second direction.

The discharge recess 17 is annularly formed along the entire outer surface 3a of the spool 3. The discharge recess 17 is located in a half of the spool 3 facing the first direction (closer to the drain port 9). A second land 20 is defined between the first connection recess 15 and the discharge recess 17.

The spool 3 has two connection channels 21 connecting the first connection recess 15 and the hydraulic oil inlet chamber 18. The two connection channels 21 are formed such that their axial direction is orthogonal to the axial direction of the spool 3. The two connection channels 21 sandwich the hydraulic oil inlet chamber 18 and are coaxially arranged.

The spool 3 has no connection channels connecting the second connection recess 16 and the hydraulic oil inlet chamber 18. This means that the second connection recess 16 is completely separated from the hydraulic oil inlet chamber 18. The spool 3 has four discharge channels 22 connecting the discharge recess 17 and the hydraulic oil inlet chamber 18. The four discharge channels 22 are formed such that their axial direction is orthogonal to the axial direction of the spool 3. The four discharge channels 22 are arranged at equal intervals in the circumferential direction of the spool 3.

Figure 2:
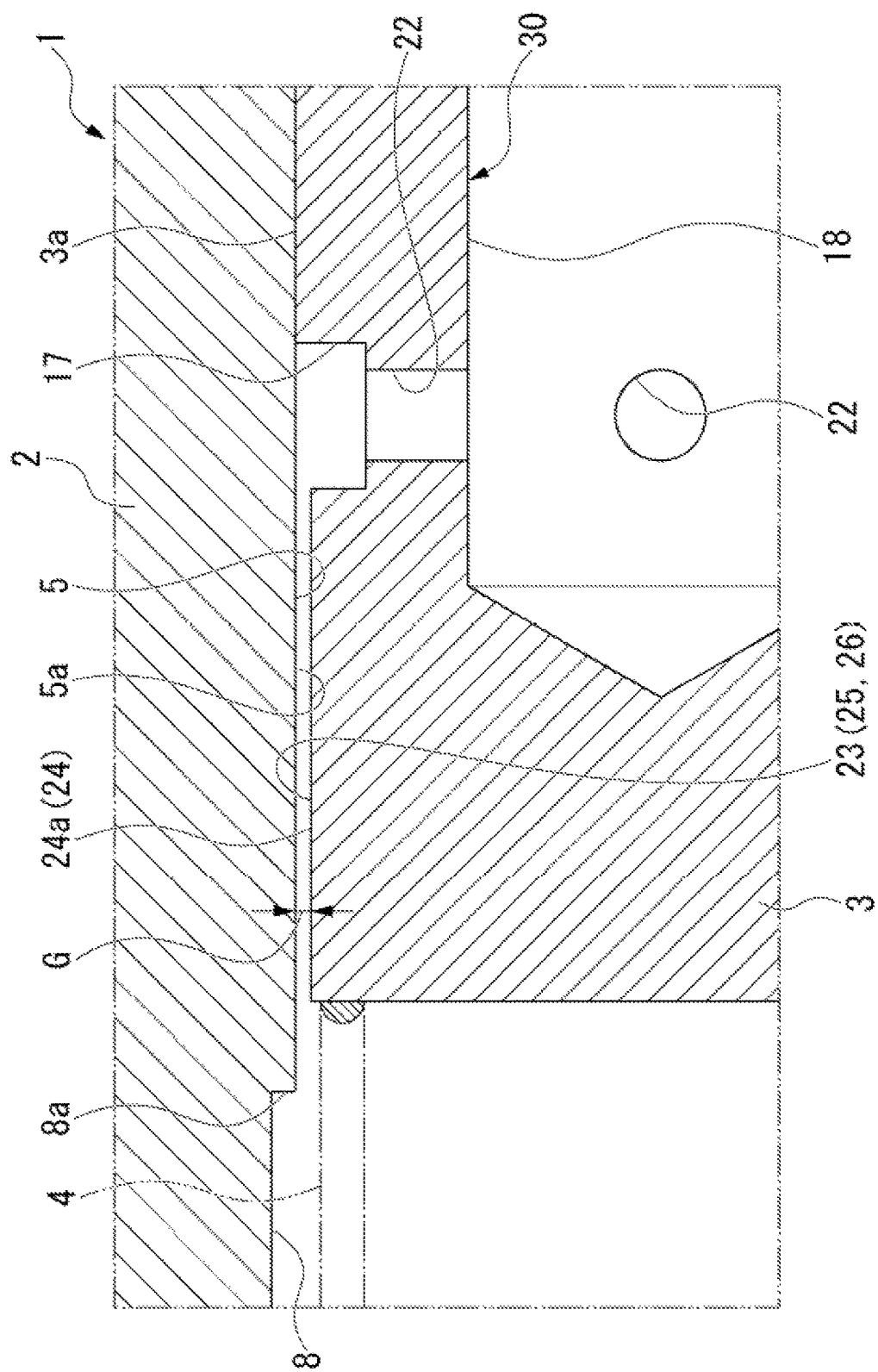
FIG. 2 is an enlarged view of a part II of FIG. 1.

FIG. 2 is an enlarged view of the part II of FIG. 1. As shown in FIGS. 1 and 2, a flow channel 23 extends between the discharge recess 17 and the end 3c of the spool 3 facing the first direction. The spool 3 has a reduced diameter portion 24 originating at the discharge recess 17 of and terminating at the end 3c of the spool 3 facing the first direction. The outer diameter of the reduced diameter portion 24 is slightly less than the outer diameters of the other portion of the spool 3. The flow channel 23 is formed between the outer surface 24a of the reduced diameter portion 24 and the inner surface 5a of the spool hole 5. The flow channel 23 is annularly shaped.

A minute gap G is provided by the flow channel 23 and extends in the radial direction. The radial width of the minute gap G, in other words, the size of the minute gap G formed between the outer surface 24a of the reduced diameter portion 24 and the inner surface 5a of the spool hole 5 is approximately equal to a filter pore size of 200 μm, for example. The flow channel 23 thus serves as a filter 25 for filtering out foreign objects from the hydraulic oil flowing through the liaison channel 30. Stated differently, the flow channel 23 serves as the filter 25 to stop intrusion of foreign matter through the drain port 9. At the same time, the flow channel 23 also serves as an orifice (throttle) 26 for regulating the flow rate of the hydraulic oil from the discharge recess 17 to the drain port 9 (this will be described in detail below).

In the drain chamber 8, a coil spring 4, which is slightly compressed, is housed. The spring force of the coil spring 4 forces the spool 3 toward the second direction. With no load being applied in the timer valve 1, the coil spring 4 causes the end 3b of the spool 3 facing the second direction to abut the plug 11. The expression "no load being applied" means that no pressure is applied by the hydraulic oil to the hydraulic oil inlet chamber 18 (this will be described in detail below).

In this case, the feeding and discharge ports 6 and 7 of the housing 2 are aligned in the radial direction with the first connection recess 15 of the spool 3. In other words, the feeding and discharge ports 6 and 7 are in communication with the first connection recess 15. Since the first connection recess 15 is annularly formed along the entire outer surface 3a of the spool 3, the feeding port 6 is connected to the discharge port 7 via the first connection recess 15.

How Timer Valve Works

The following now describes how the timer valve 1 works. As shown in FIG. 1, with no hydraulic oil being fed to the timer valve 1 (no load being applied), the mechanical brake 14 applies a braking force onto the hydraulic actuator, which is not shown. If the operating unit 12 is operated, the hydraulic oil is fed to the feeding port 6. The hydraulic oil then flows through the first connection recess 15, to flow into the discharge port 7. The hydraulic oil further flows into the mechanical brake 14. The pressure of the hydraulic oil can stop the braking force applied by the mechanical brake 14.

Figure 3:
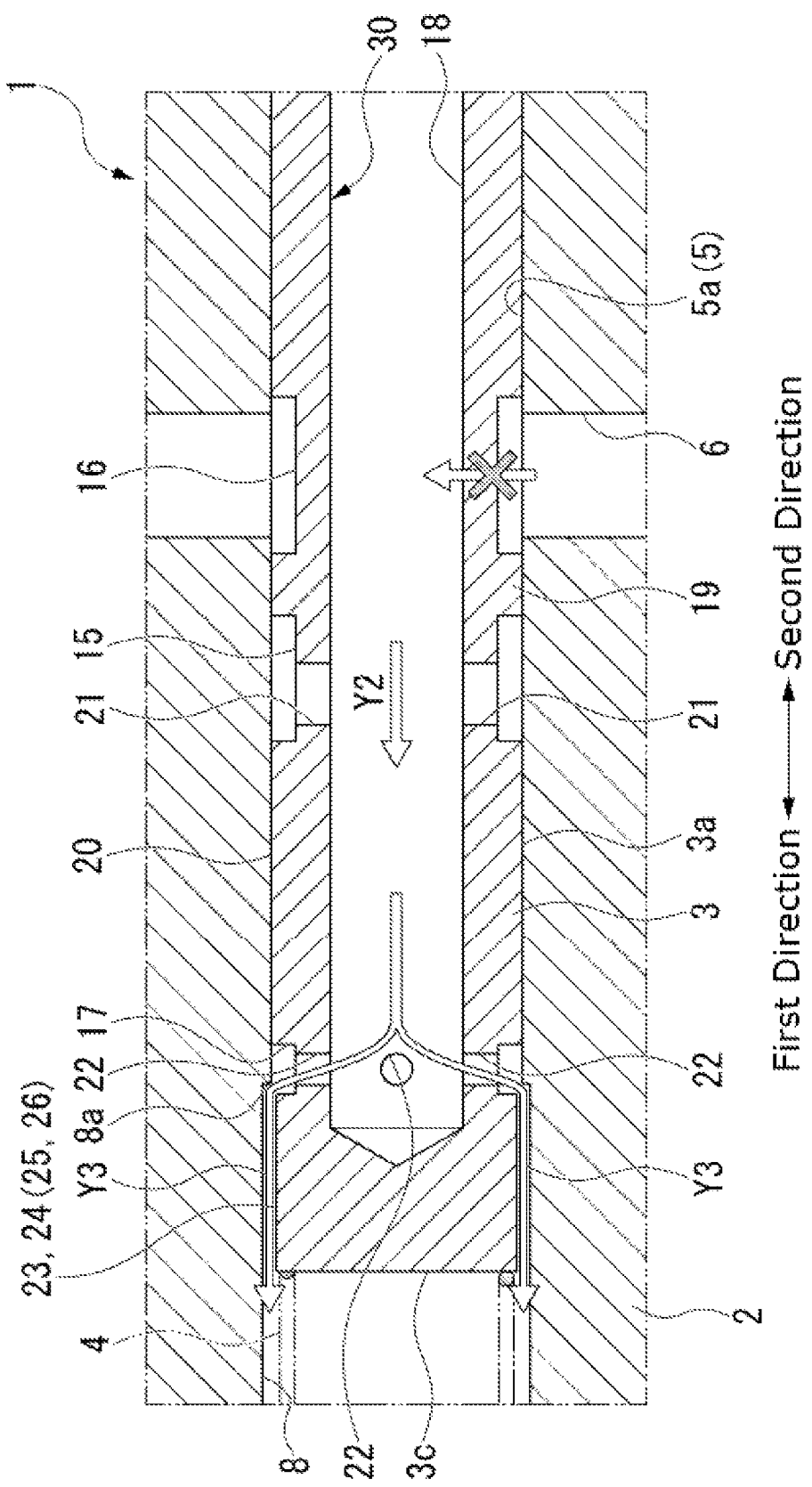
FIG. 3 illustrates how the timer valve relating to the embodiment of the present disclosure works.

FIG. 3 shows how the timer valve 1 works. FIG. 3 corresponds to FIG. 1. As shown in FIGS. 1 and 3, the hydraulic oil fed to the feeding port 6 flows through the first connection recess 15 and connection channels 21, and then finally flows into the hydraulic oil inlet chamber 18 (see the arrow Y1 in FIG. 1). This results in raising the pressure in the hydraulic oil inlet chamber 18. Here, the hydraulic oil inlet chamber 18 is open at the end 3b of the spool 3 facing the second direction. The increased pressure overcomes the spring force of the coil spring 4, so that the spool 3 can slide in the first direction (see the arrow Y2 in FIG. 3).

As a result, the feeding port 6 is connected to the discharge port 7 via the second connection recess 16. Since the second connection recess 16 is completely separated from the hydraulic oil inlet chamber 18, the hydraulic oil does not flow into the hydraulic oil inlet chamber 18. Meanwhile, the hydraulic oil keeps flowing into the mechanical brake 14 via the discharge port 7, so that the braking by the mechanical brake 14 remains stopped.

The hydraulic oil flowing into the hydraulic oil inlet chamber 18 also flows into the discharge channels 22 and discharge recess 17, passes through the flow channel 23, and flows into the drain chamber 8 (see the arrow Y3 in FIG. 3). The hydraulic oil in the drain chamber 8 is fed back to the tank 10 through the drain port 9. Since the hydraulic oil in the hydraulic oil inlet chamber 18 is fed back, the pressure in the hydraulic oil inlet chamber 18 drops.

As a result, the spring force of the coil spring 4 overcomes the pressure in the hydraulic oil inlet chamber 18, so that the spool 3 again slides toward the second direction. This again connects the first connection recess 15 with the feeding and discharge ports 6 and 7, thereby allowing the hydraulic oil to flow into hydraulic oil inlet chamber 18. The flow channel 23 functions as the orifice 26, which can regulate the flow rate of the hydraulic oil from the hydraulic oil inlet chamber 18 into the drain chamber 8. The flow channel 23 also serves as the filter 25. The flow channel 23 inhibits the passage of foreign matter, which effectively filters out foreign objects from the hydraulic oil flowing from the hydraulic oil inlet chamber 18 into the drain chamber 8.

As described above, while the hydraulic oil is fed through the feeding port 6, balance is established between the hydraulic oil fed from the hydraulic oil inlet chamber 18 back to the tank 10 and the hydraulic oil fed to the hydraulic oil inlet chamber 18, thereby enabling the spool 3 to stay at a predetermined position. When the spool 3 is at the predetermined position, the first land 19 is approximately aligned with the feeding and discharge ports 6 and 7.

In order to allow the mechanical brake 14 to apply a braking force again, the operating unit 12 is operated to suspend the flow of the hydraulic oil into the feeding port 6. This does not immediately result in application of the braking force by the mechanical brake 14. Specifically, if the flow of the hydraulic oil into the feeding port 6 is suspended, the hydraulic oil no longer flows into the hydraulic oil inlet chamber 18 of the spool 3. The hydraulic oil left in the hydraulic oil inlet chamber 18 is thus gradually discharged into the drain chamber 8 through the discharge channels 22, discharge recess 17, and flow channel 23.

The first connection recess 15 is then connected to the feeding and discharge ports 6 and 7. This causes the hydraulic oil in the mechanical brake 14 to flow back into the hydraulic oil inlet chamber 18. The hydraulic oil in the mechanical brake 14 is also gradually discharged into the drain chamber 8 through the hydraulic oil inlet chamber 18, discharge channels 22, discharge recess 17 and flow channel 23. As a result, the hydraulic oil pressure no longer acts on the mechanical brake 14, allowing the mechanical brake 14 to regenerate a braking force. In the above-described manner, the timer valve 1 may control the mechanical brake 14 such that the mechanical brake 14 may generate a braking force at a point of time later than when the operator operates the operating unit 12.

In the above-described embodiment, the flow channel 23, which serves as the filter 25, constitutes part of the liaison channel 30 formed in the timer valve 1. Therefore, no independent filters are needed to filter out foreign objects from the hydraulic oil fed back to the tank 10. The timer valve 1 can be made up by a reduced number of parts, so that its production can be managed in a simplified manner.

The flow channel 23 is defined as the minute gap G so that foreign matter included in the hydraulic oil flowing through the flow channel 23 is caught between the outer surface 3a of the spool 3 and the inner surface 5a of the spool hole 5. In this way, the space between the outer surface 3a of the spool 3 and the inner surface 5a of the spool hole 5 (flow channel 23) can certainly serve as the filter 25. The flow channel 23 is defined by the reduced diameter portion 24 of the spool 3, which is formed between the discharge recess 17 and the end 3c of the spool 3 facing the first direction and has a slightly smaller outer diameter than the other portion of the spool 3. The minute gap G serving as the filter 25 can be obtained in such a simple manner.

According to the above embodiment, the radial width of the minute gap G between the outer surface 24a of the reduced diameter portion 24 and the inner surface 5a of the spool hole 5 is approximately equal to a filter pore size of 200 μm, for example. The present embodiment, however, is not limited to such, and the width of the minute gap G can be sized in any manner as long as the minute gap G can prevent foreign matter of a desired size.

First Modification Example

Figure 4:
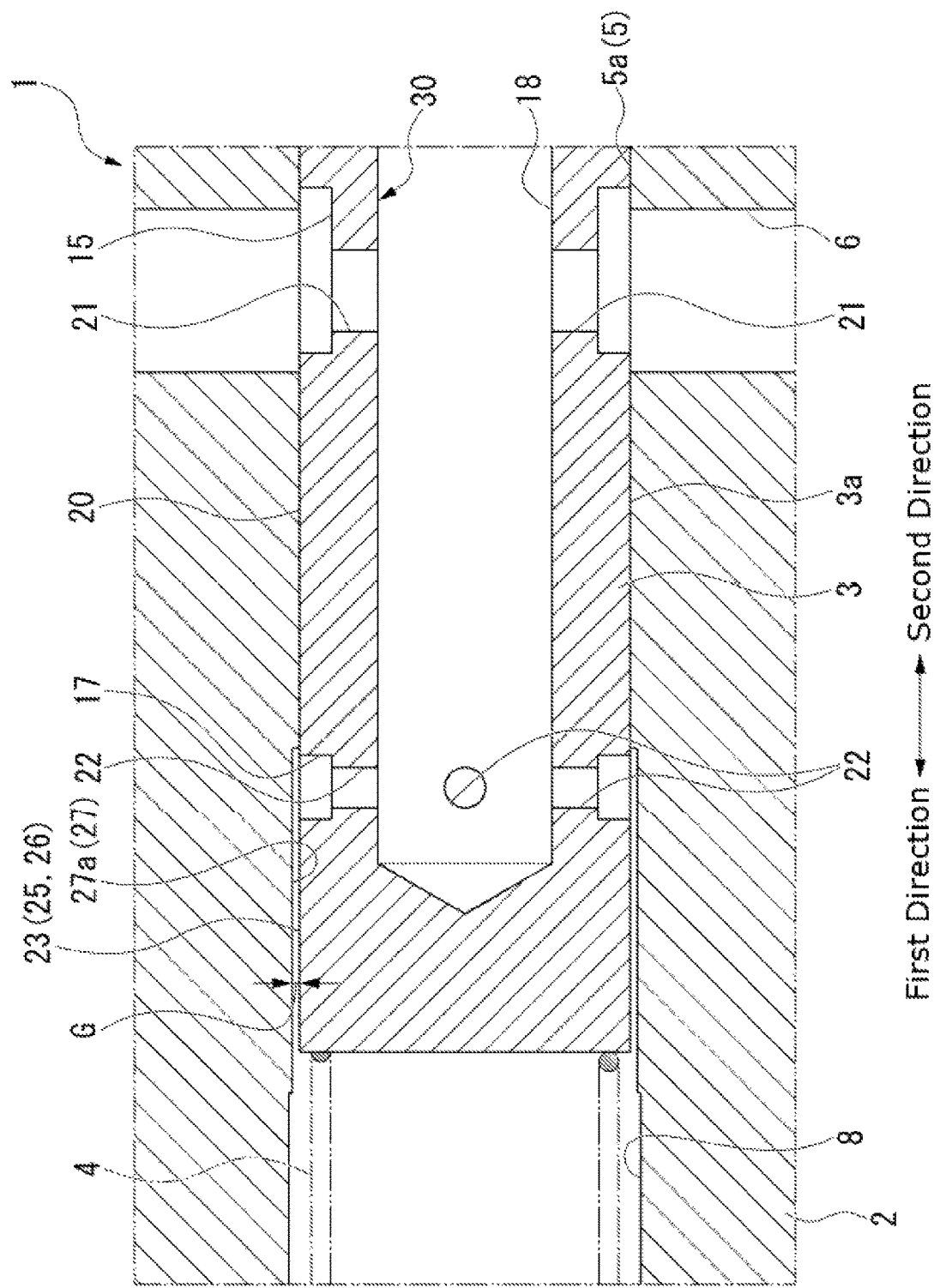
FIG. 4 schematically shows the configuration of a timer valve relating to a first modification example of the present disclosure.

FIG. 4 schematically shows the configuration of the timer valve 1 relating to a first modification example. FIG. 4 corresponds to FIG. 1 referred to in the above (this applies to the following modification examples). In the above-described embodiment, the flow channel 23 is defined by the reduced diameter portion 24 of the spool 3. The reduced diameter portion 24 originates at the discharge recess 17 and terminates at the end 3c of the spool 3 facing the first direction and has a slightly smaller outer diameter than the other portion of the spool 3.

The present embodiment, however, is not limited to such. As shown in FIG. 4, the spool hole 5 may have an increased diameter portion 27 in a half of the spool hole 5 facing the first direction. The increased diameter portion 27 has a slightly larger inner diameter than the other portion. The flow channel 23 may be formed between the inner surface 27a of the increased diameter portion 27 and the outer surface 3a of the spool 3. The increased diameter portion 27 is positioned or sized depending on the range within which the spool 3 can move. According to this modification example, the minute gap G serving as the filter 25 can be obtained in a simple manner.

Second Modification Example

Figure 5:
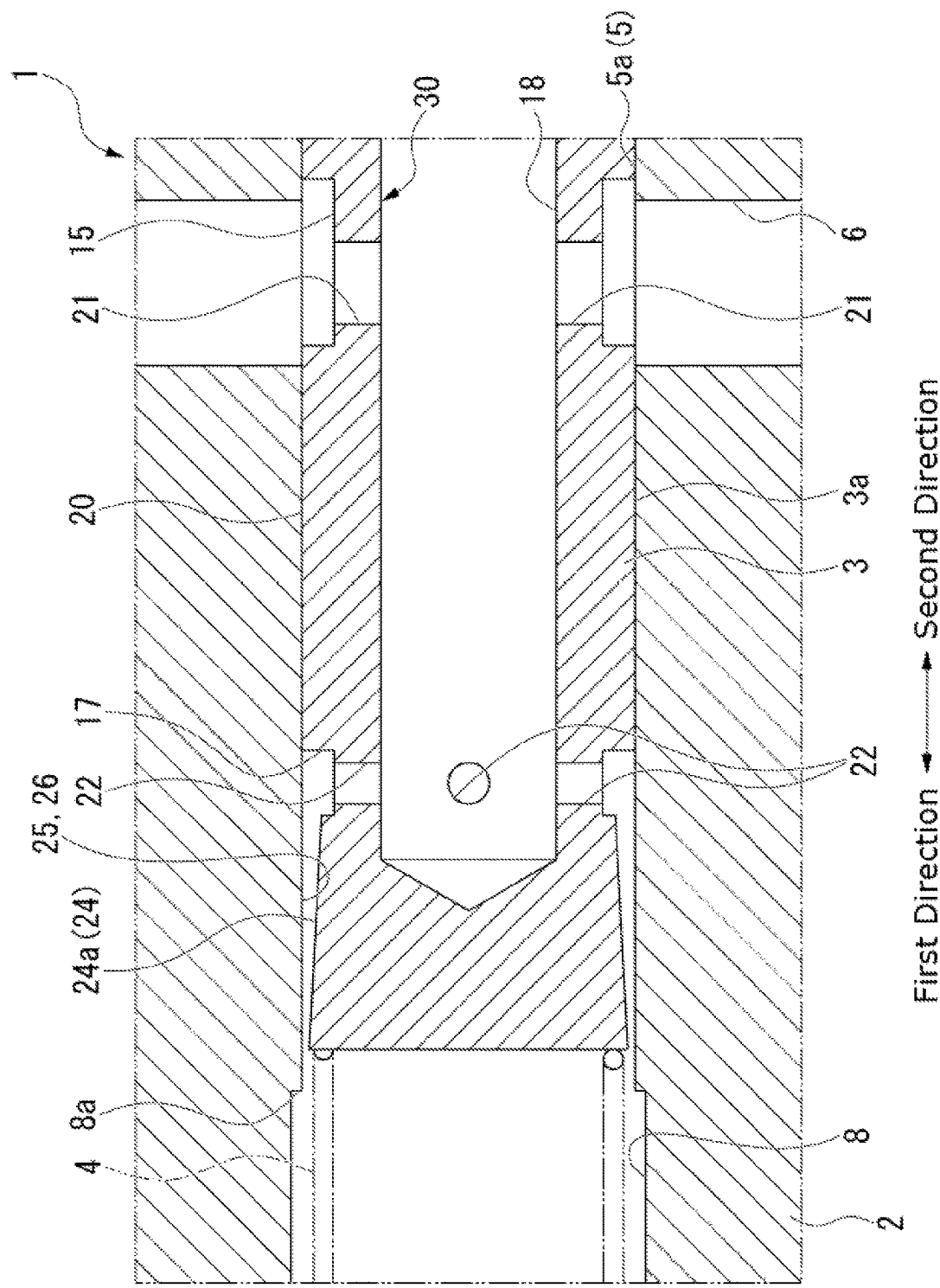
FIG. 5 schematically shows the configuration of a timer valve relating to a second modification example of the present disclosure.

FIG. 5 schematically shows the configuration of the timer valve 1 relating to a second modification example. As shown in FIG. 5, the reduced diameter portion 24 of the spool 3 may be inclined such that its outer diameter gradually increases toward the first direction. Thus, the radial width of the minute gap G forming the flow channel 23 becomes progressively smaller toward the first direction (drain port 9).

In this manner, foreign objects of different sizes are trapped at different sites in the filter 25 (flow channel 23). In this way, foreign objects of various sizes can avoid being trapped at the same site in the flow channel 23. This can prevent the flow channel 23 from being clogged by the foreign objects.

In the second modification example, the reduced diameter portion 24 of the spool 3 is inclined. The present embodiment, however, is not limited to such. Alternatively, a portion of the inner surface 5a of the spool hole 5 that corresponds to the flow channel 23 may be inclined, so that the radial width of the minute gap G forming the flow channel 23 may be progressively decreased toward the first direction (drain port 9). Alternatively, the reduced diameter portion 24 and the inner surface 5a of the spool hole 5 may be both inclined.

The inclination mentioned in the second modification example is not necessarily provided by a flat inclined surface. The inclination can be achieved in any manner as long as the radial width of the minute gap G forming the flow channel 23 gradually decreases toward the first direction (drain port 9). For example, the reduced diameter portion 24 of the spool 3 and/or the inner surface 5a of the spool hole 5 may be curved.

Third Modification Example

Figure 6:
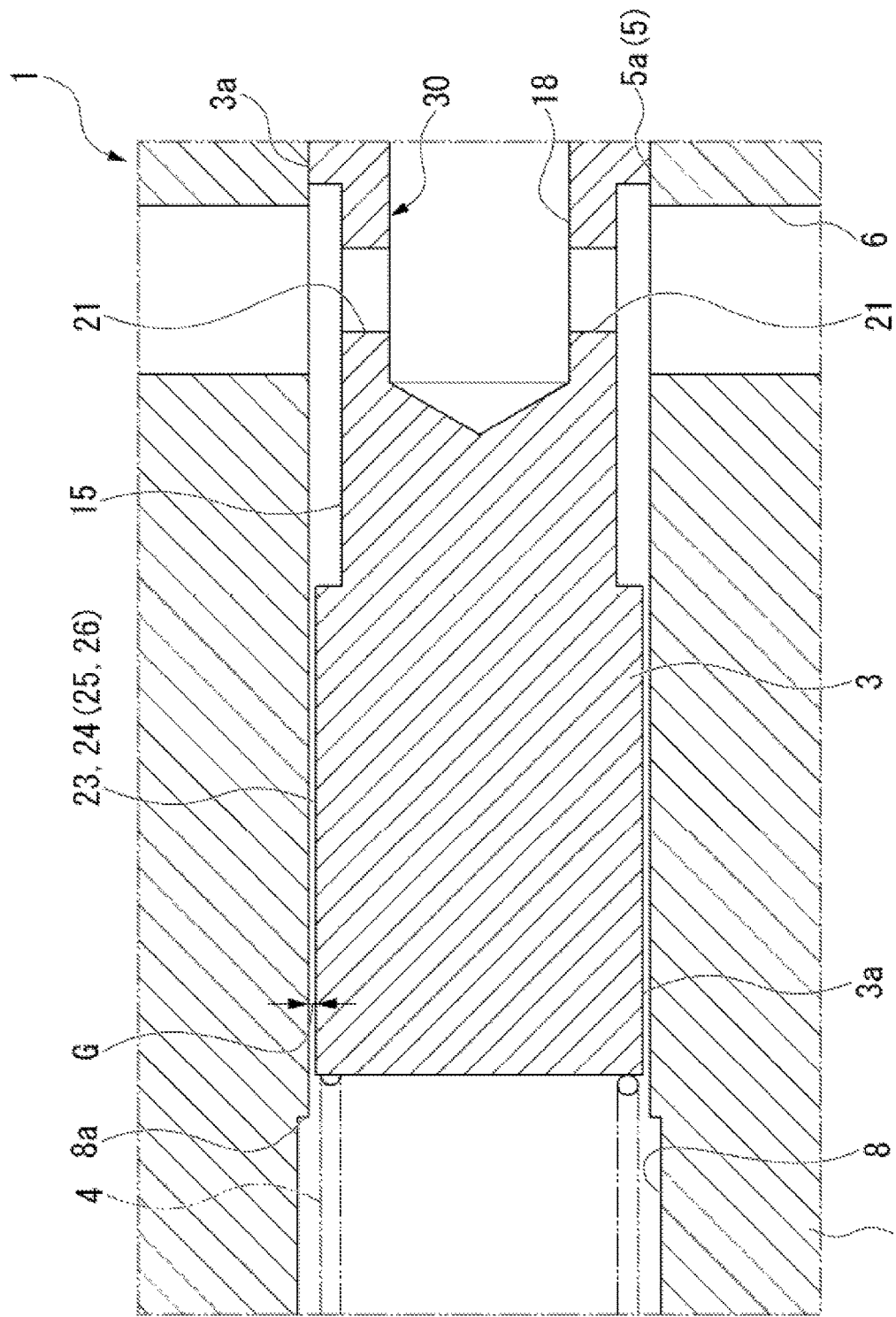
FIG. 6 schematically shows the configuration of a timer valve relating to a third modification example of the present disclosure.

FIG. 6 schematically shows the configuration of the timer valve 1 relating to a third modification example. According to the above-described embodiment, the spool 3 has the discharge recess 17 and discharge channels 22, and the flow channel 23 (filter 25 and orifice 26) extends on the outer surface 3a of the spool 3 between the discharge recess 17 and the end 3c of the spool 3 facing the first direction (see FIGS. 1 and 2). The present embodiment, however, is not limited to such. As shown in FIG. 6, the spool 3 may not necessarily have the discharge recess 17 and discharge channels 22.

In the third modification example, the first connection recess 15 extends farther toward the first direction than in the embodiment. The flow channel 23 (filter 25, orifice 26) thus extends between the first connection recess 15 and the end 3c of the spool 3 facing the first direction. This modification example can produce the same effects as the above-described embodiment. In addition, the length of the hydraulic oil inlet chamber 18 can be reduced, and the discharge recess 17 and discharge channels 22 are no longer necessary. Therefore, the manufacturing cost of the timer valve 1 can be reduced.

Fourth Modification Example

Figure 7:
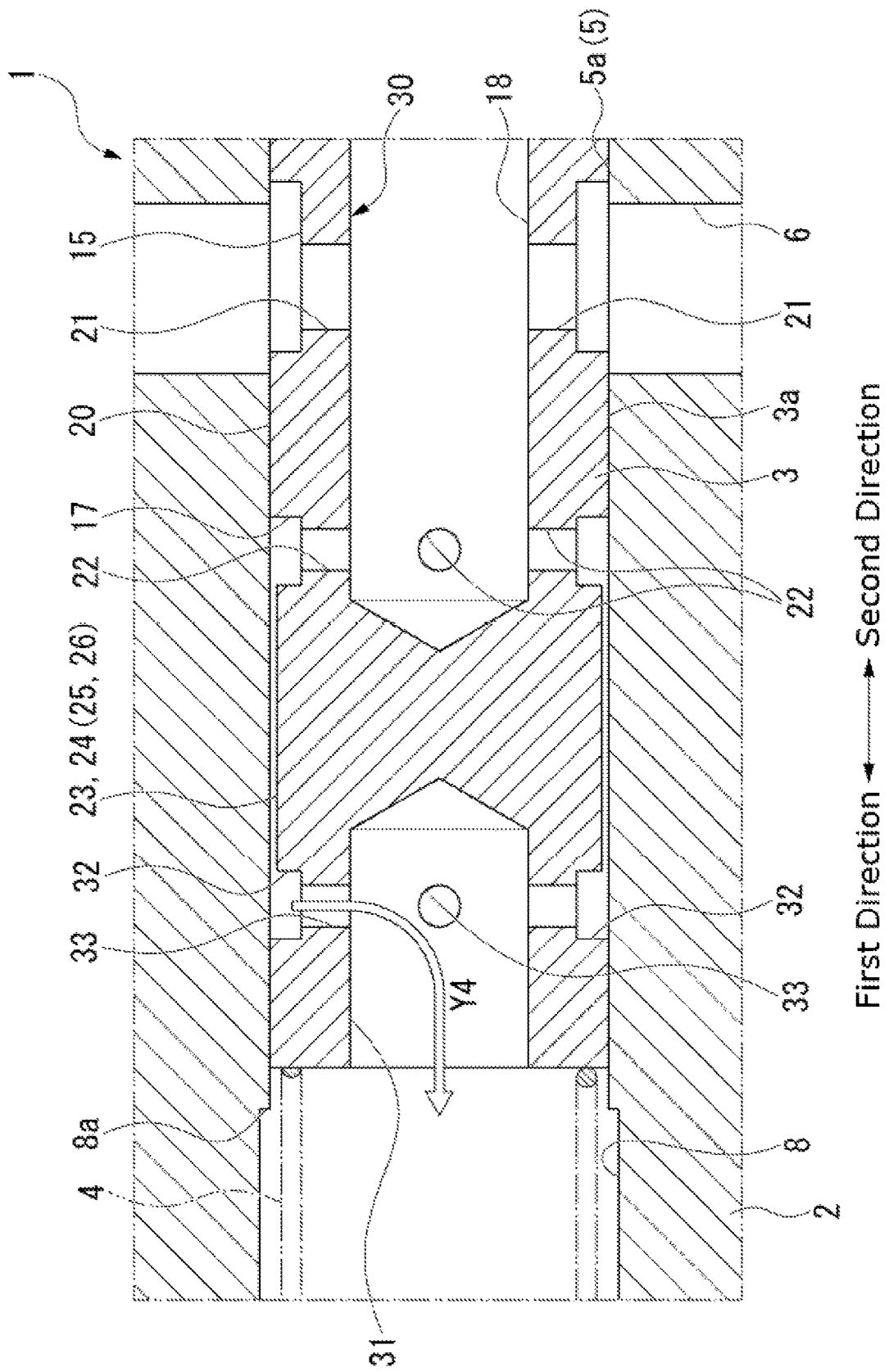
FIG. 7 schematically shows the configuration of a timer valve relating to a fourth modification example of the present disclosure.

FIG. 7 schematically shows the configuration of the timer valve 1 relating to a fourth modification example. As shown in FIG. 7, the liaison channel 30 may include a discharge chamber 31 formed at the end 3c of the spool 3 facing the first direction and an inlet recess 32 (inlet channel 33) in communication with the discharge chamber 31. The discharge chamber 31 and hydraulic oil inlet chamber 18 are coaxially arranged. The discharge chamber 31 is not in communication with the hydraulic oil inlet chamber 18.

The inlet recess 32 is annularly shaped and extends along the entire outer surface 3a of the spool 3. The inlet recess 32 is aligned, in the radial direction of the spool 3, with a half of the discharge chamber 31 that faces the hydraulic oil inlet chamber 18. The spool 3 has four inlet channels 33 connecting the inlet recess 32 and the discharge chamber 31. The four inlet channels 33 are formed such that their axial direction is orthogonal to the axial direction of the spool 3. The four inlet channels 33 are arranged at equal intervals in the circumferential direction of the spool 3. The flow channel 23 (filter 25 and orifice 26) extends between the inlet recess 32 and the discharge recess 17.

According to this modification example, the hydraulic oil flowing into the flow channel 23 is discharged into the discharge chamber 31 through the inlet recess 32 and inlet channels 33 (see the arrow Y4 in FIG. 7). The hydraulic oil further flows through the discharge chamber 31 and goes back to the tank 10 through the drain chamber 8 and drain port 9.

The fourth modification example described above thus produces the same effects as the foregoing embodiment. In addition, since the discharge chamber 31 and inlet recess 32 (inlet channels 33) are provided, the flow channel 23 can be shifted (offset) toward the second direction from the end 3c of the spool 3 facing the first direction. In other words, it is no longer necessary to define the flow channel 23 at the end 3c of the spool 3 facing the first direction. When the spool 3 is inserted into the spool hole 5, the periphery of the end 3c of the spool 3 may collide with the housing 2 and get damaged. This modification example can avoid such a collision. The damaged periphery may impair the role of the minute gap G as the filter 25. According to the fourth modification example, the flow channel 23 (minute gap G) can reliably and satisfactorily serve as the filter 25 and orifice 26.

Fifth Modification Example

Figure 8:
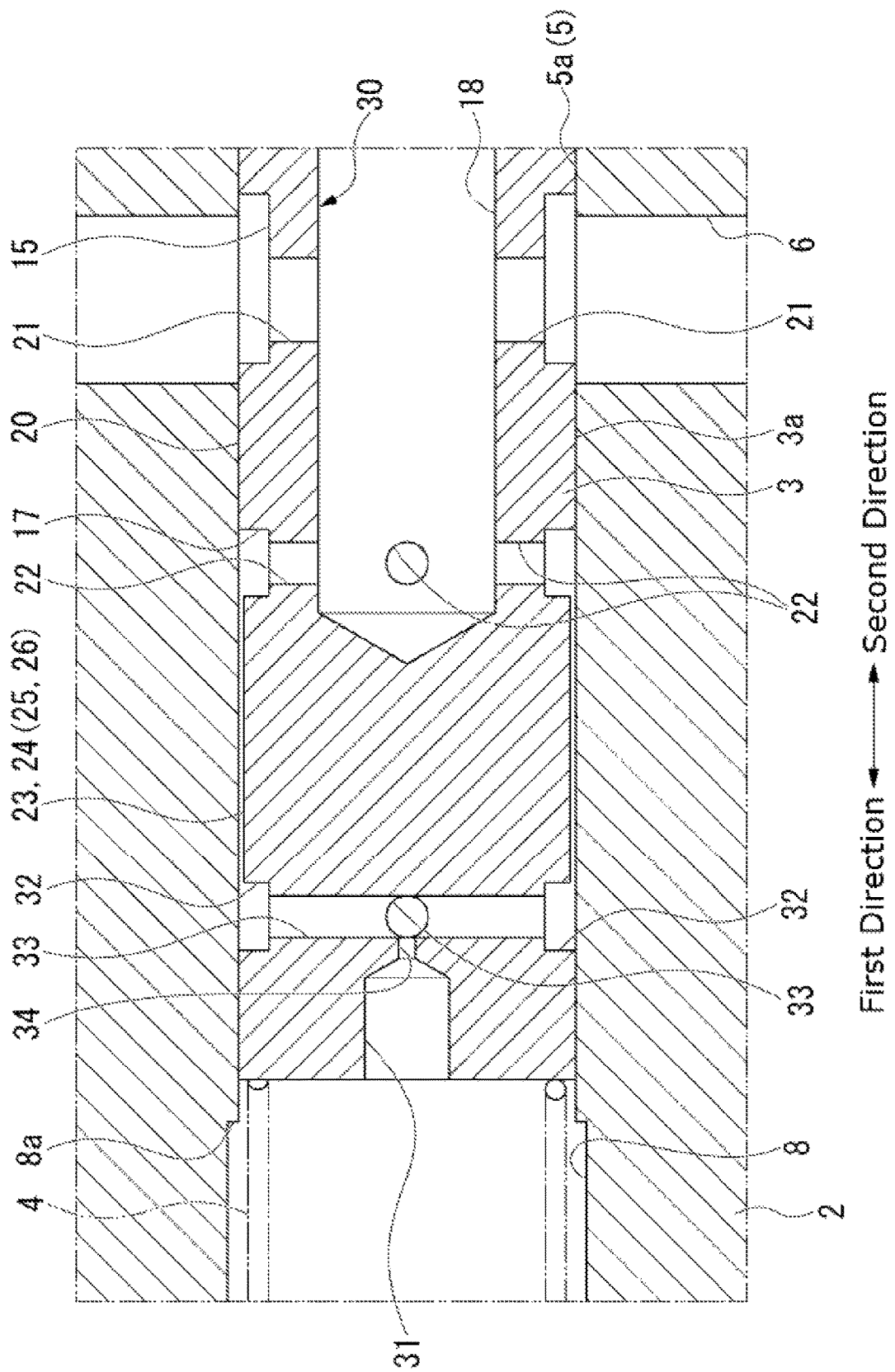
FIG. 8 schematically shows the configuration of a timer valve relating to a fifth modification example of the present disclosure.

FIG. 8 schematically shows the configuration of the timer valve 1 relating to a fifth modification example. As shown in FIG. 8, an orifice 34 may be additionally provided in the discharge chamber 31 relating to the fourth modification example described above. According to the present modification example, the orifice 34 is separately provided, and the flow channel 23 is thus required to serve only as the filter 25. According to the above-described embodiment, the flow channel 23 is required to serve both as the filter 25 and the orifice 26. It may be difficult to successfully satisfy both of the required functions. The fifth modification example, however, can allow the flow channel 23 to serve as the filter 25 more appropriately. Additionally, the flow rate of the hydraulic oil discharged from the hydraulic oil inlet camber 18 to the drain port 9 can be controlled more appropriately.

The embodiments described herein are not intended to necessarily limit the present disclosure to any specific embodiments. Various modifications can be made to these embodiments without departing from the true scope and spirit of the present disclosure. In the above-described embodiment, the timer valve 1 has the flow channel 23, which serves as the filter 25 and orifice 26. The present disclosure, however, is not limited to such. The flow channel 23 serving both as the filter 25 and orifice 26 can be formed in various other valves (control valves) than the timer valve 1.

According to the above-described embodiment, the timer valve 1 is used in hydraulic excavators and other construction machines. However, the present disclosure is not limited to such, and the above-described timer valve 1 can be applied for various construction machines. According to the above-described embodiment, the timer valve 1 using hydraulic oil is described as an example of a fluid valve. The present disclosure, however, is not limited to such, and the above-described configuration can be employed in various other fluid valves using a fluid. The fluid is not limited to hydraulic oil, but can be a variety of liquids and gases.

In the above-described embodiment, the reduced diameter portion 24 is formed directly in the spool 3, or the increased diameter portion 27 is formed directly in the spool hole 5. The present disclosure, however, is not limited to such, and the reduced diameter portion 24 of the spool 3 and the increased diameter portion 27 of the spool hole 5 may be sized larger than the designed values to receive tubular bushings. The outer and inner surfaces of the bushings may be accurately processed, so that the radial width of the minute gap G formed by the flow channel 23 can be easily and highly accurately controlled.

The above-described embodiment uses the coil spring 4 as the elastic member for forcing the spool 3 toward the second direction. The present disclosure, however, is not limited to such, and the elastic member may be configured in any manner as long as it can force the spool 3 toward the second direction. The coil spring 4 may be replaced with other elastic members such as rubber members. The rubber members may be only required not to close the drain chamber 8.

The foregoing embodiments disclosed herein describe a plurality of physically separate constituent parts. They may be combined into a single part, and any one of them may be divided into a plurality of physically separate constituent parts. Irrespective of whether or not the constituent parts are integrated, they are acceptable as long as they are configured to solve the problems.

What is claimed is:
1. A fluid valve comprising:
a housing having a spool hole, a feeding port and a discharge port, the spool hole being in communication with a drain port, the feeding port being configured to receive a hydraulic fluid fed thereto, and the discharge port being configured to discharge the hydraulic fluid; and
a spool movably provided in the spool hole,
wherein the spool has:
a connection recess defined in an outer surface of the spool, the connection recess being configured to establish communication between the feeding port and the discharge port; and
a liaison channel establishing communication between the connection recess and the drain port,
wherein, within the liaison channel, a filter is formed between the spool hole and the outer surface of the spool to stop foreign matter from entering into the drain port,
wherein the liaison channel has:
a fluid inlet chamber extending along a central axis of the spool, the fluid inlet chamber being in communication with the connection recess; and
a discharge recess defined in the outer surface of the spool, the discharge recess being positioned closer to the drain port than is the connection recess, the discharge recess being in communication with the fluid inlet chamber, and
wherein the filter extends between the discharge recess and an end of the spool facing the drain port.

2. The fluid valve of claim 1, wherein the filter has a minute gap formed between the spool hole and the outer surface of the spool, and
wherein a radial width of the minute gap is sized to inhibit passage of foreign matter of a desired size.

3. The fluid valve of claim 2, wherein the minute gap constitutes a given part of a gap formed between the spool hole and the outer surface of the spool, and the minute gap has a greater radial width than a remaining part of the gap formed between the spool hole and the outer surface of the spool since a corresponding part of the spool hole has a large inner diameter or a corresponding part of the outer surface of the spool has a small outer diameter.

4. The fluid valve of claim 3, wherein at least one of an inner surface of the spool hole or the outer surface of the spool between which the minute gap is formed is inclined with respect to an axial direction such that the radial width of the minute gap progressively decreases toward the drain port.

5. The fluid valve of claim 1, wherein the liaison channel has:
a discharge chamber extending along an axis of the spool, the discharge chamber being formed at the end of the spool facing the drain port; and
an inlet recess defined in the outer surface of the spool, the inlet recess being positioned closer to the drain port than is the discharge recess, the inlet recess being in communication with the discharge chamber,
wherein the filter extends between the discharge recess and the inlet recess.

6. The fluid valve of claim 5, comprising a throttle provided in the discharge chamber, the throttle being configured to regulate an amount of hydraulic fluid discharged from the discharge chamber to the drain port.

7. The fluid valve of claim 1, comprising an elastic member provided in the spool hole and lying between the drain port and the spool, the elastic member being configured to force the spool away from the drain port,
wherein the spool has another connection recess defined in the outer surface, the other connection recess being positioned on an opposite side to the drain port with respect to the connection recess, and
wherein the other connection recess is disconnected from the fluid inlet chamber.

8. A fluid valve comprising:
a housing having a spool hole, a feeding port and a discharge port, the spool hole being in communication with a drain port, the feeding port being configured to receive a hydraulic fluid fed thereto, and the discharge port being configured to discharge the hydraulic fluid;
a spool movably provided in the spool hole; and
an elastic member provided in the spool hole and lying between the drain port and the spool, the elastic member being configured to force the spool away from the drain port,
wherein the spool has:
a connection recess defined in an outer surface of the spool, the connection recess being configured to establish communication between the feeding port and the discharge port;
another connection recess defined in the outer surface of the spool, the other connection recess being positioned on an opposite side to the drain port with respect to the connection recess, the other connection recess being configured to establish communication between the feeding port and the discharge port;
a fluid inlet chamber extending along a central axis of the spool, the fluid inlet chamber being in communication with the connection recess; and
a discharge recess defined in the outer surface of the spool, the discharge recess being positioned closer to the drain port than is the connection recess, the discharge recess being in communication with the fluid inlet chamber,
wherein a filter extends between the discharge recess and an end of the spool facing the drain port to stop foreign matter from entering into the drain port,
wherein the filter has a minute gap formed between the spool hole and the outer surface of the spool, and
wherein a radial width of the minute gap is sized to inhibit passage of foreign matter of a desired size.

* * * * *